Feb. 2, 1932.   O. H. BANKER   1,843,193
AUTOMATIC TRANSMISSION
Filed April 9, 1930   11 Sheets-Sheet 5
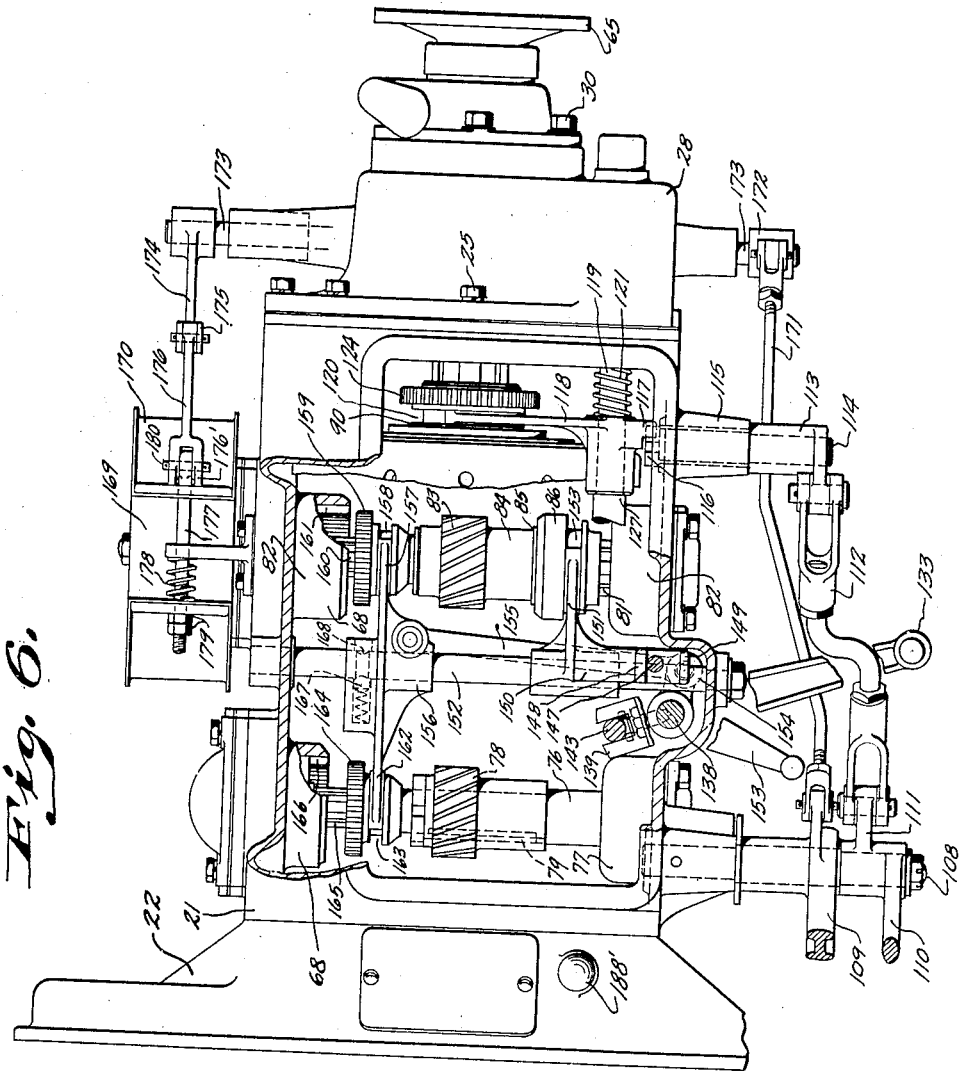
INVENTOR.
Oscar H. Banker
BY
Charles & French
ATTORNEYS

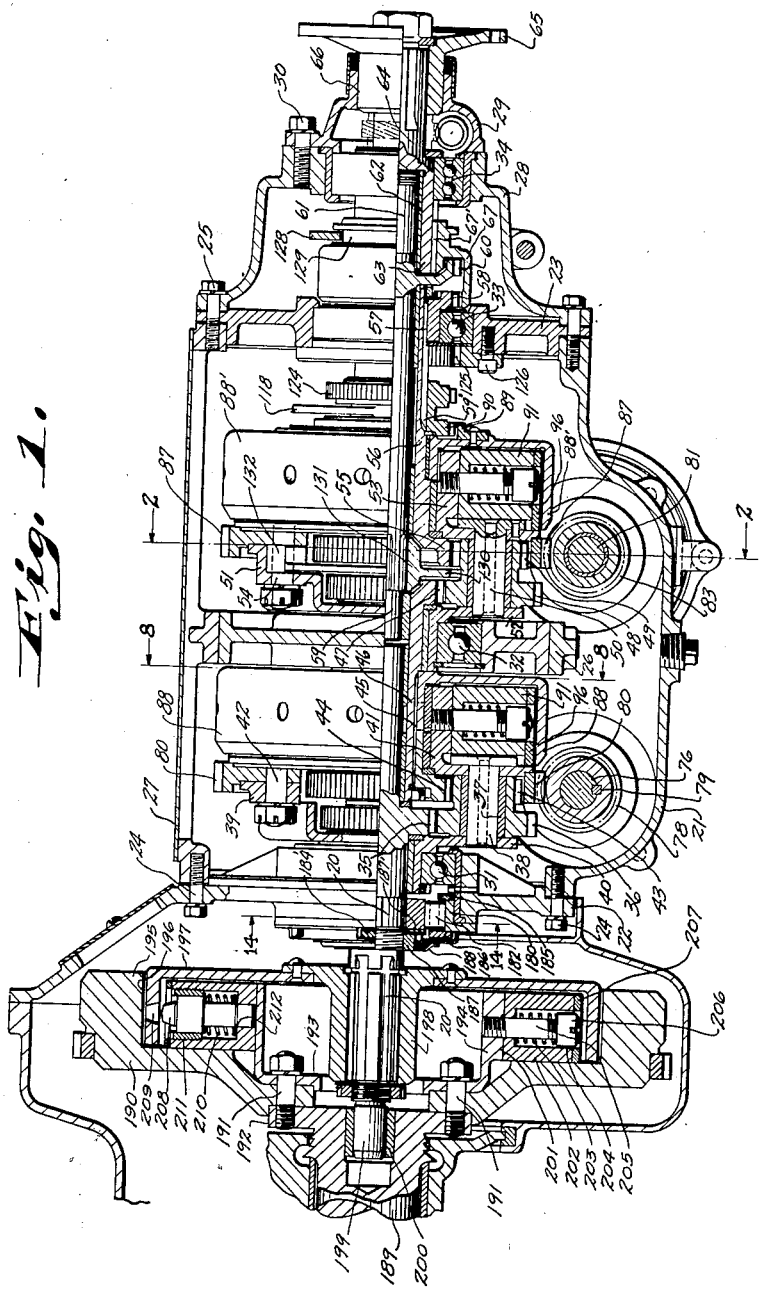

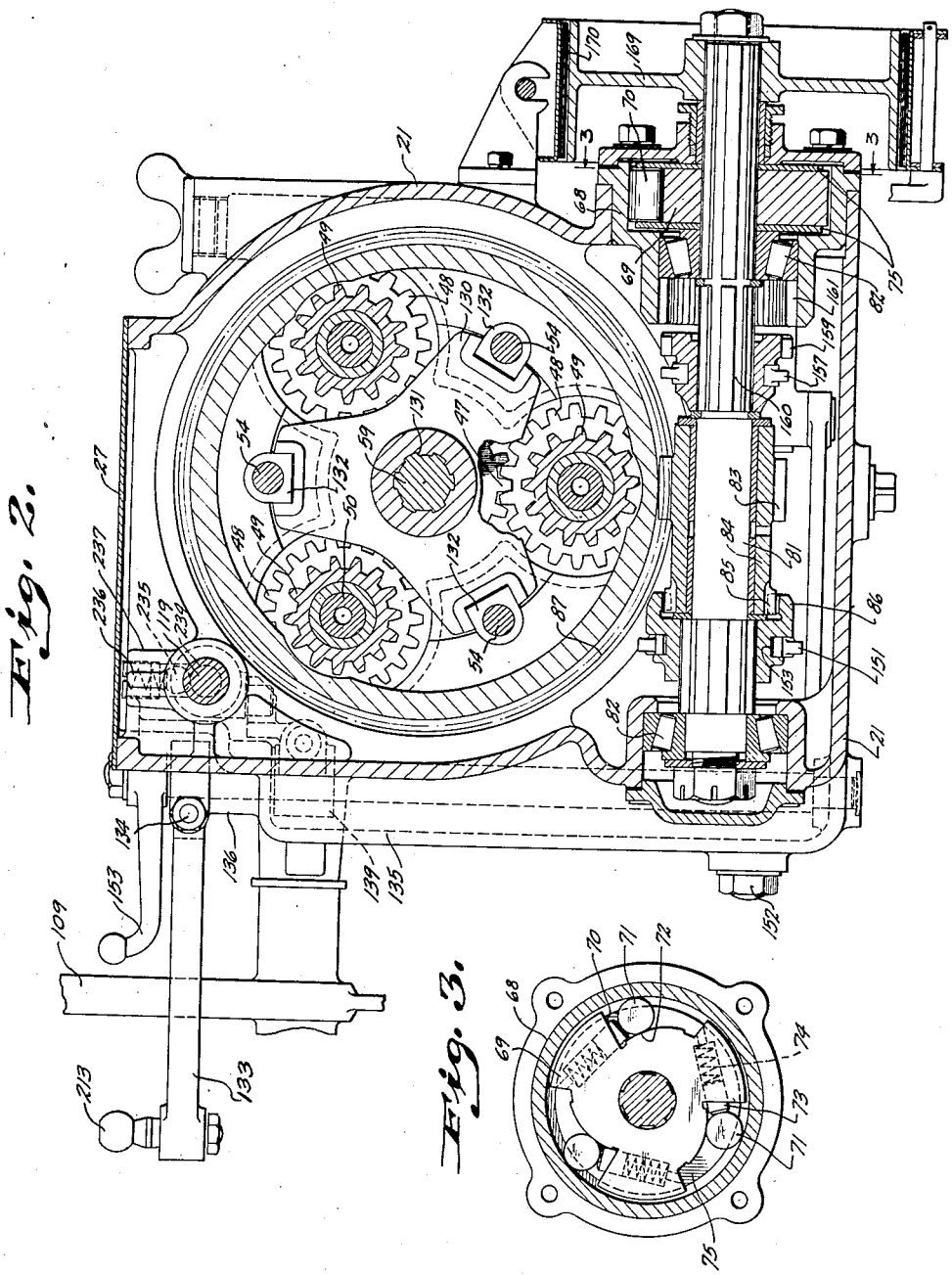

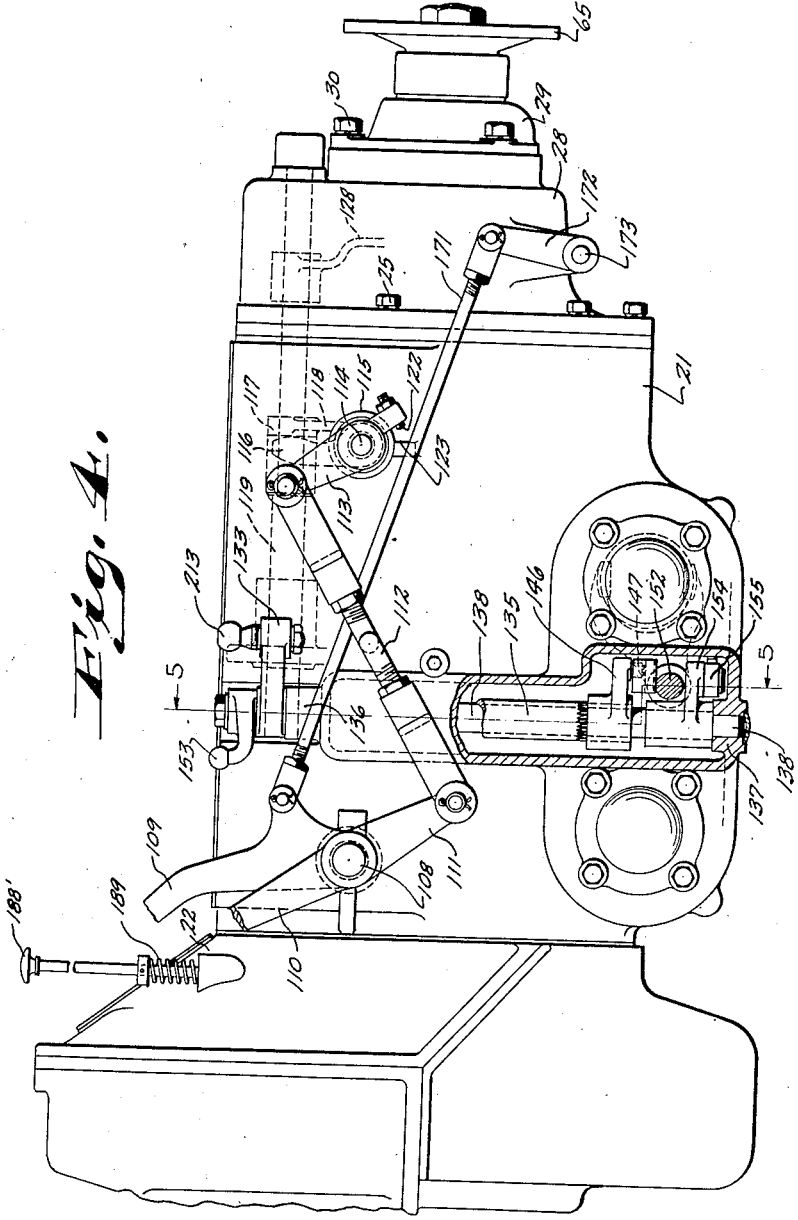

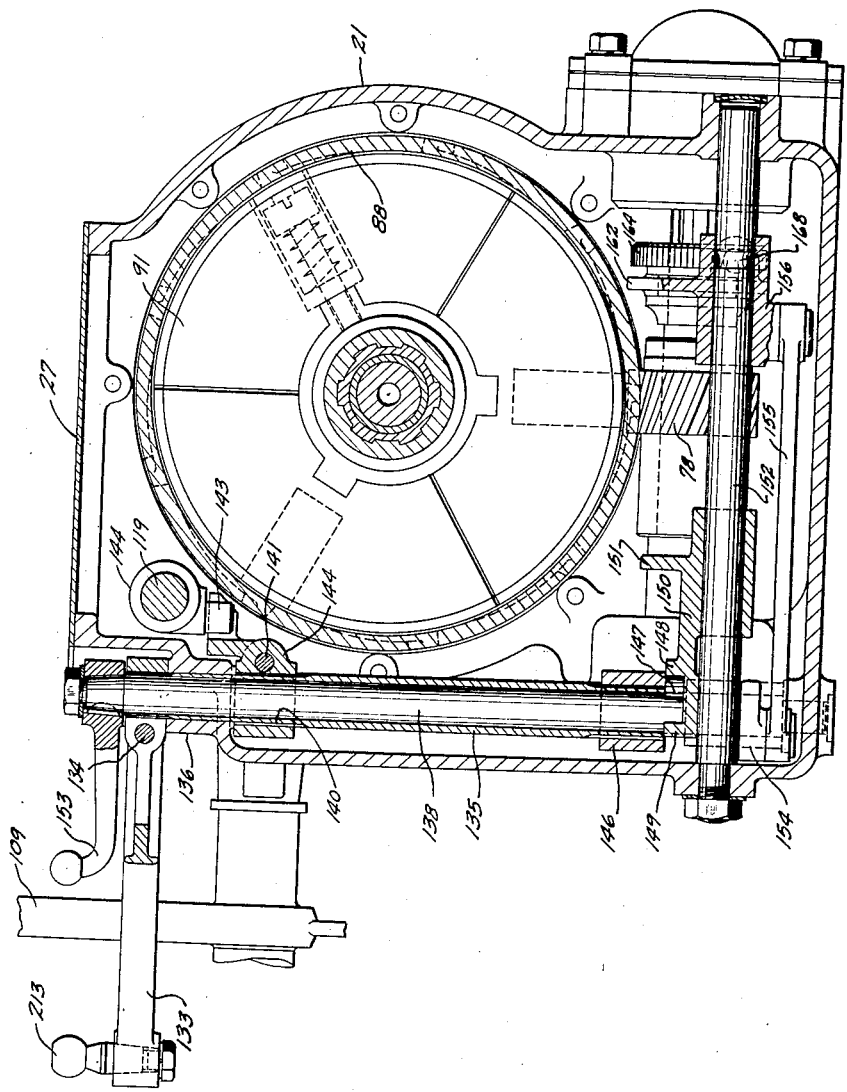

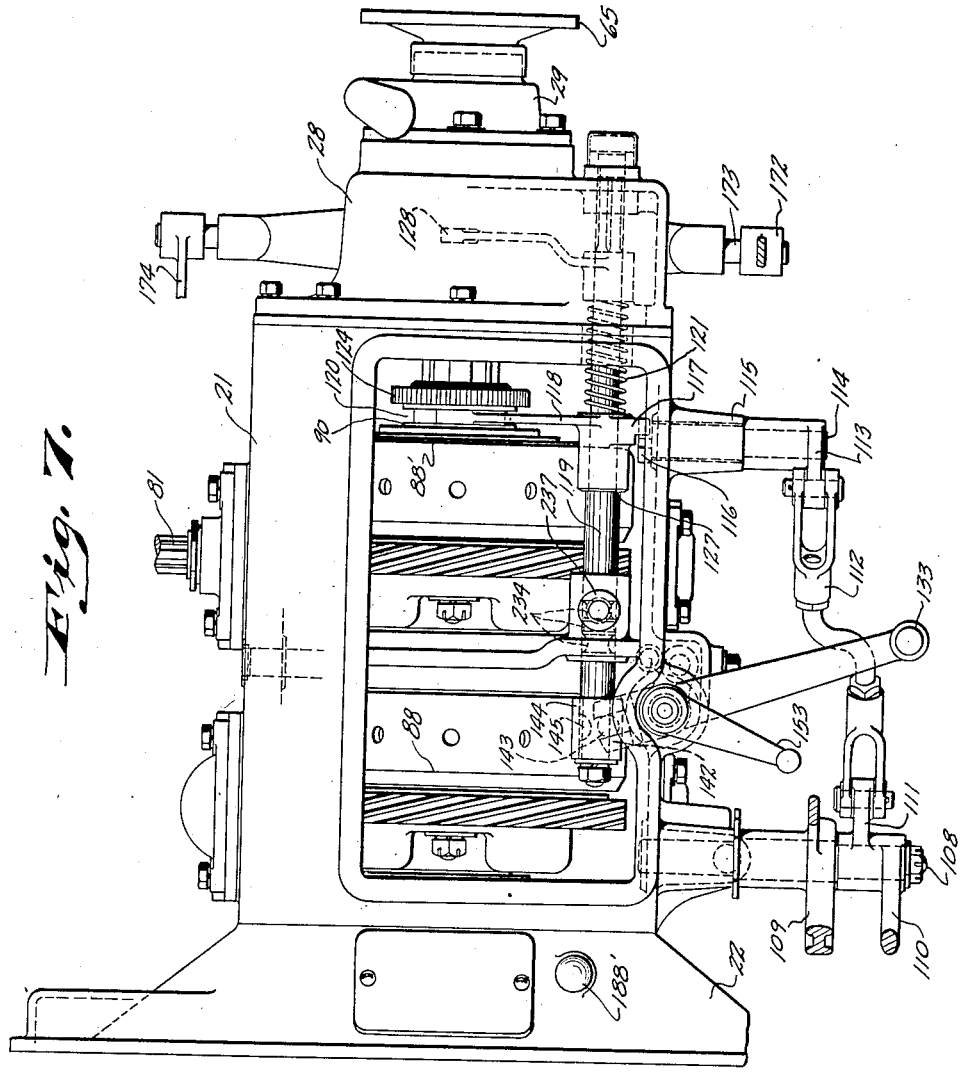

Feb. 2, 1932.　　　　O. H. BANKER　　　1,843,193
AUTOMATIC TRANSMISSION
Filed April 9, 1930　　　11 Sheets-Sheet 7
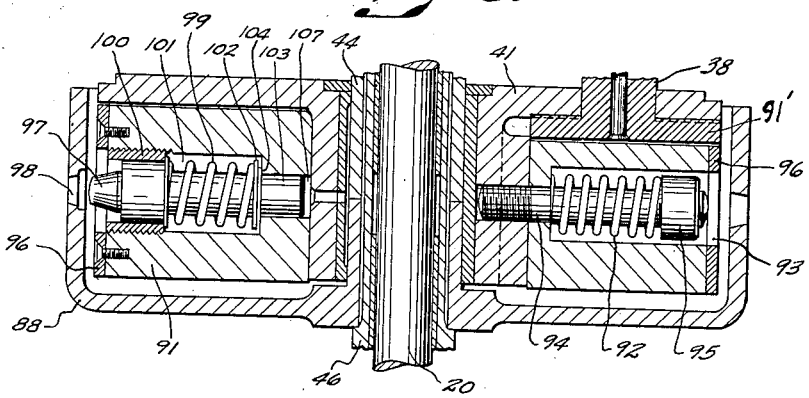
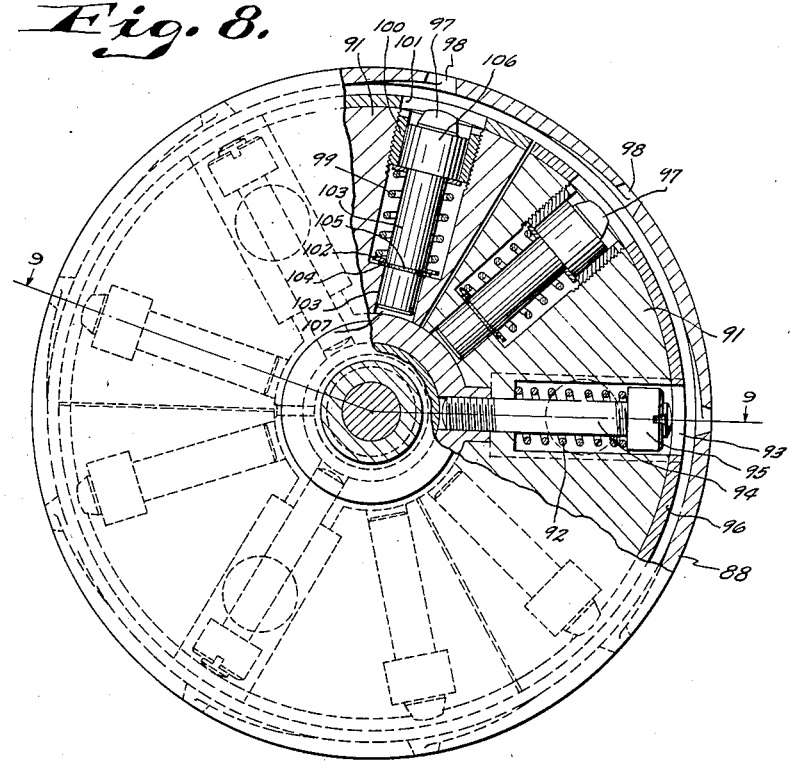
INVENTOR.
Oscar H. Banker
BY
Charles & French
ATTORNEYS.

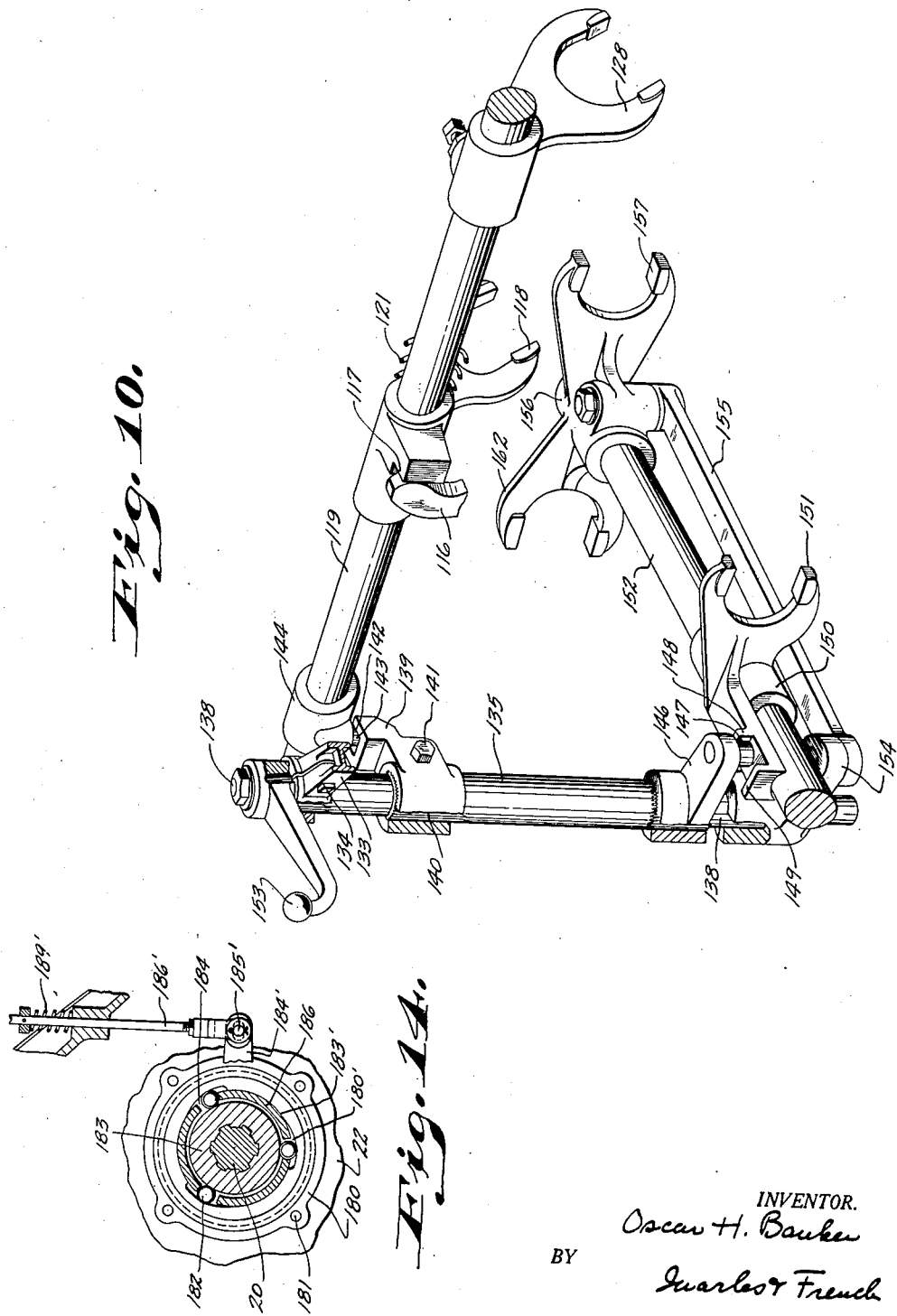

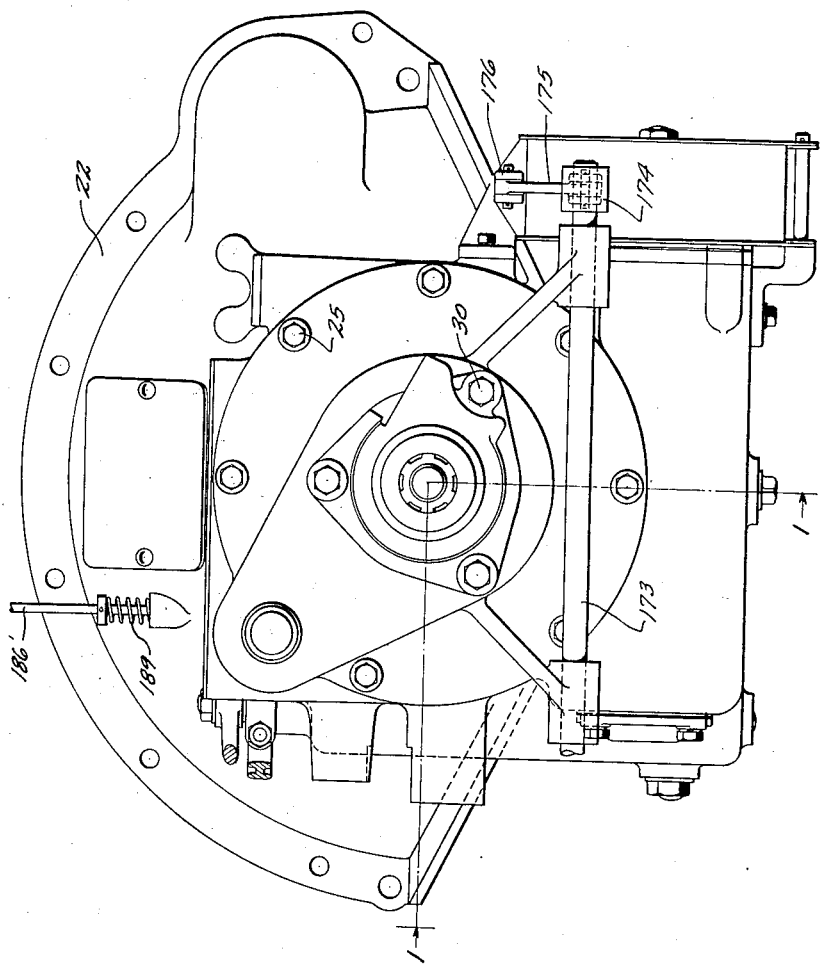

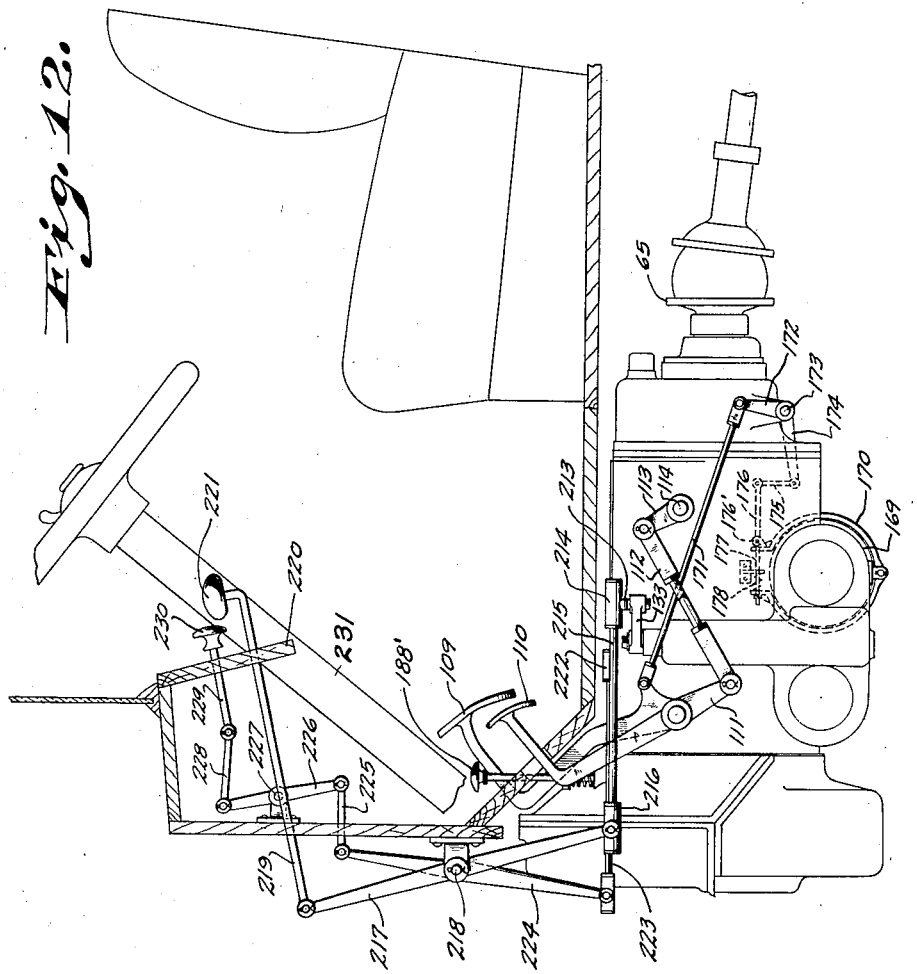

Feb. 2, 1932.   O. H. BANKER   1,843,193
AUTOMATIC TRANSMISSION
Filed April 9, 1930   11 Sheets-Sheet 11
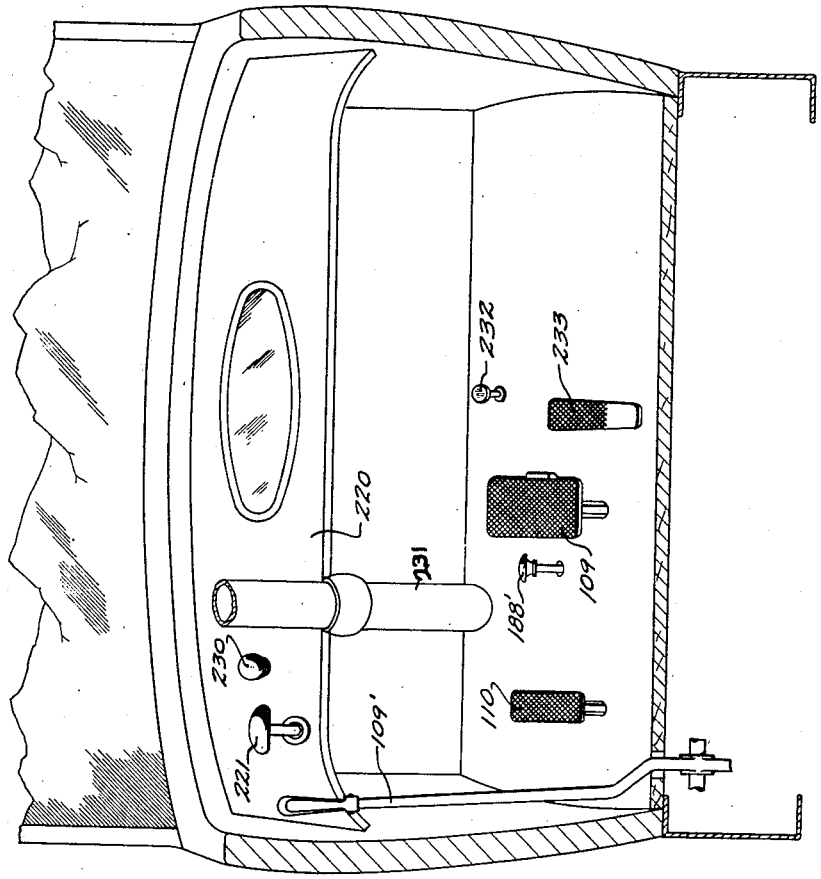
INVENTOR.
Oscar H. Banker
BY
Quarles & French
ATTORNEYS Patented Feb. 2, 1932

1,843,193

UNITED STATES PATENT OFFICE

OSCAR H. BANKER, OF PHILADELPHIA, PENNSYLVANIA, ASSIGNOR TO CONTINENTAL ILLINOIS BANK & TRUST COMPANY, OF CHICAGO, ILLINOIS, A CORPORATION OF ILLINOIS, AS TRUSTEES

AUTOMATIC TRANSMISSION

Application filed April 9, 1930. Serial No. 442,846.

The invention relates to automatic change speed transmissions and more particularly to those of the planetary gear type wherein the change of gear ratio is automatically effected through the action of speed responsive clutch mechanism.

In any planetary gearing the speed reduction is effected by holding the planet gear carrier against movement so that the reduction can be effected through the difference in gear ratios of the drive and driven gears. In such gearing also when the drive shaft starts to turn there is a constant tendency for the drive gear acting through the planet gears to turn the planet carrier in the opposite direction to that of the drive gear. In an automatic transmission attempts have been made to use pawl and ratchets and band brakes of various forms to utilize this backward rotation tendency to hold the planetary gear carrier but so far as I am aware none of these have been commercially successful. In the present invention this usual difficulty with automatic change speed planetary gearing has been successfully solved in a manner that has definitely been proved successful in practice by the association with the planetary carrier of one-way roller brake mechanism, preferably intergeared with each carrier. It is also a well-known fact in the operation of planetary gearing mechanism that when the driven member is rotated or is rotating faster than the drive member the planet gears will turn in the same direction as the driven member and carry the planetary gear carrier with them and when in the present instance they do so turn the automatic brake mechanism above referred to will be released. Thus, in the present invention the automatic brake mechanism, whose continued satisfactory operation is absolutely vital to the successful operation of the transmission, has been found to possess the necessary requirements and is operated to engage on the tendency of said carrier to move backward and moved to disengaging position by a temporary reduction in speed of the drive shaft relative to the driven shaft.

When, under the above circumstances, the planetary gear carrier is free to turn, some means must be provided to connect said carrier with its driven gear so that the whole planetary gearing will turn as a unit and an automatic speed responsive clutch mechanism is used for this purpose. With the automatic one-way brake associated with the automatic clutch mechanism mentioned above the clutch elements are stationary except when the drive shaft is decelerated, whereby the automotive vehicle will remain in gear as long as the driver wishes and wear on the clutch elements is reduced, but when said clutch elements are engaged, since their action is positive, another source of wear has been eliminated by the present invention.

A further object of the invention is to provide an automatic transmission whereby the vehicle may be put in second gear while going at high speed, as where the vehicle in climbing a long hill starts to lose momentum, and at such time if the operator waits for the automatic mechanism to shift the vehicle into second gear such a change would occur at speeds, for example, of ten to fifteen miles per hour, thereby losing too much momentum. The direct shift into second prevents this loss of momentum and the vehicle can be shifted into second gear while travelling at thirty or forty miles per hour, by the operator. Also where the vehicle is travelling in traffic, when the driver encounters a slow moving vehicle and finds that his acceleration in high gear is not sufficient to pass the interfering vehicle, he can immediately shift into second and accelerate his car at a high rate of speed to pass the slow moving vehicle. This direct shift into second is so constructed and arranged that there is no danger of injuring the parts, whether shifting in or out of gear, while the vehicle is moving at forty miles an hour or at higher speeds.

A further object of the invention is to provide a transmission construction wherein the reverse is effected without the necessity for a jack shaft and one of the planetary units is used to effect the reversal.

A further object of the invention is to provide controls for the change speed gear units, with means for positively locking the planetary gear carriers to keep the vehicle in gear and more particularly a simple, single control for both units, whereby movement of said control part way locks one gear carrier in gear and a further movement of said control locks both gear carriers in gear.

A further object of the invention is to provide a left foot control for putting the vehicle into gear while going at speeds of thirty to forty miles an hour with the right foot free for the throttle control.

A further object of the invention is to provide a transmission wherein the manual control of the main clutch is eliminated and an automatic clutch is used to connect the engine shaft with the drive shaft of the transmission.

A further object of the invention is to provide means on the main drive shaft for preventing the vehicle from rolling backwards down hill when the drive is otherwise connected.

The invention further consists in the several features hereinafter set forth and more particularly defined by claims at the conclusion hereof.

Referring to the drawings, Fig. 1 is a vertical sectional view through a transmission embodying the invention, taken on the line 1—1 of Fig. 11.

Fig. 2 is a detail sectional view taken on the line 2—2 of Fig. 1;

Fig. 3 is a detail sectional view taken on the line 3—3 of Fig. 2;

Fig. 4 is a side view of the transmission, parts being broken away and parts being shown in section;

Fig. 5 is a detail sectional view taken on the line 5—5 of Fig. 4;

Fig. 6 is a top view of the transmission, parts being broken away and parts being shown in section;

Fig. 7 is a top view of the transmission with the top cover removed;

Fig. 8 is a detail sectional view taken on the line 8—8 of Fig. 1, with parts broken away and parts snown in section;

Fig. 9 is a detail sectional view taken on the broken line 9—9 of Fig. 8;

Fig. 10 is a perspective view of the shifter control mechanism;

Fig. 11 is a rear end view of the transmission;

Fig. 12 is a side elevation view showing the installation of a transmission on a vehicle;

Fig. 13 is a front elevation view of the dash portion of the vehicle, showing the controls;

Fig. 14 is a detail sectional view taken on the line 14—14 of Fig. 1.

Referring to the drawings, the numeral 20 designates the drive shaft, which in an automotive vehicle is the shaft operatively connected to the drive shaft of the engine through any suitable clutch mechanism, but which in the present instance is preferably an automatic clutch, hereinafter described.

Referring to Fig. 1, the transmission includes a body casing 21 having end plates 22 and 23 secured thereto by a series of bolts 24 and 25, an intermediate bearing section 26, a removable top cover 27 for the body casing, an end housing 28 secured to the end plate 23 by the bolts 25, and a speedometer housing 29 secured to the end of the housing 28 by bolts 30.

The end plate 22, section 26, end plate 23 and the housing 28 are respectively equipped with ball bearing journals 31, 32, 33 and 34.

The shaft 20 has a gear 35 formed integral therewith or connected thereto, which meshes with gears 36, each provided with a bearing 37 mounted on a stud shaft 38 mounted on the planet gear carrier 39 of the first change-speed unit and which carrier is formed by spiders or flanged disks 40 and 41, which are fixedly secured together by bolts 42.

Each gear 36 is a compound gear having connected to it a gear 43 which meshes with a gear 44 which is splined by a key 45 to a suitably bushed sleeve shaft 46 loosely mounted on the drive shaft 20. This gearing forms the first planetary change-speed unit. It will also be noted that the hub of the spider 40 is journalled in the bearing 31 and that as the drive shaft is concentric with said hub it also is supported by the end plate 22; that the hub of the spider 41 is journalled in part on the hub of the gear 44 and that the drive shaft 20 is concentric with and extends part way through the sleeve shaft 46.

The shaft 46 is provided at its rear end with a gear 47 which meshes with gears 48 of the second change speed unit and corresponding to the gears 36 so that the first unit, through the drive gear 44, effects the drive of the second unit, which includes the gears 49 compounded with the gears 48 and journalled on stud shafts 50, similar to the shafts 38, and mounted in a planet carrier 51 formed by the spiders or flanged disks 52 and 53, which are fixedly secured together by bolts 54. The gears 49 mesh with a gear 55 formed on a sleeve shaft 56 secured by a key 57 to the hub of a gear 58 which is journalled in the bearing 33. This gearing forms the second planetary change-speed unit.

The hub of the spider 52 is journalled in the bearing 32, the sleeve shaft 46 at this end within said hub and a driven shaft 59 within the forward end of said sleeve shaft 46, said shaft 59 also extending through and being free to rotate in the sleeve shaft 56 and having a gear 60 formed integral with or connected to it adjacent its outer end 61 which fits into the bushed bearing 62 in the hollow end 63 of an alined driven shaft 64 that in turn is journalled in the bearing 34 and has a propeller shaft coupling flange 65 splined to it and extending loosely through the end 66 of the speedometer housing 29.

The shaft 64 has a clutch gear 67 slidably keyed on the key 67' and adapted to be moved into mesh with the clutch gear 58 for forward drive and with the clutch gear 60 for reverse drive.

From the foregoing description it will be noted that when the planetary gear carriers 39 and 51 are prevented from rotating that the vehicle will be driven in low gear, the drive being from shaft 20, gears 35, 36, 43 and 44, shaft 46, clutch gears 47, 48, 49 and 55, shaft 56, gears 58 and 67, and the driven shaft 64; that when the planet carrier 39 is free to rotate with the shaft 20 the vehicle will be in second gear, the drive being from shaft 20 to shaft 46 with the planetary gears of the first unit acting as keys, thence through gears 47, 48, 49 and 55 to shaft 56, clutch gears 58 and 67 and shaft 64; that when both planet carriers 39 and 51 are free to rotate with their respective drive shafts the vehicle will be in high gear or shafts 20, 46 and 64 will be directly connected together.

In any planetary gearing the speed reduction is effected by holding the planet gear carrier against movement so that the reduction can be effected through the difference in gear ratios of the drive and driven gears. In such gearing also when the drive shaft starts to turn there is a constant tendency for the drive gear acting through the planet gears to turn the planet carrier in the opposite direction to that of the drive gear. This backward rotation tendency is utilized to effect the automatic application of a one-way roller brake mechanism intergeared with each carrier.

Each brake mechanism, as shown in detail in Fig. 3, includes a stationary casing or brake drum 68, a rotary brake actuator 69 having wedging recesses 70 formed therein, and roller brake members 71 mounted in said recesses and adapted to be wedged by the inclined bottoms 72 of said recesses into locked engagement therewith and with the drum in one direction of rotation and to be released from the drum in the opposite direction of rotation of said carrier, each of said rollers being normally urged toward braking position by a plunger 73 slidably mounted in the actuator and backed by a spring 74 and being prevented from end movement by plates 75 mounted on the shafts carrying the actuators.

The one-way brake for the first planetary gear unit has its actuator mounted on a shaft 76 which is journalled in bearings 77 in the casing 21 and carries a spiral gear 78 adapted to be normally keyed to said shaft by a key 79 and meshing with a spiral gear 80 secured to the spider 41 of the first planetary gear carrier, the ratio of the gears 78 and 80 preferably being such that the shaft 76 rotates at a slower speed than the planetary carrier. (See Figs. 1 and 6.)

The one-way brake for the second planetary gear unit has its actuator mounted on a shaft 81 which is journalled in bearings 82 in the casing 21 and carries a spiral gear 83 whose hub 84 is journalled on it and adapted to be normally keyed to said shaft through a clutch gear 85 formed in said hub and normally meshing with a clutch gear 86 slidably splined on the shaft 81. The spiral gear 83 meshes with a spiral gear 87 secured to the spider 130 of the second planetary gear carrier, the ratio of the gears 83 and 87 preferably being such that the shaft 81 rotates at a slower speed than the planetary carrier. (See Fig. 2).

Thus, when the planetary carrier 39 of the first change-speed unit tends to rotate backwards the gear 80 turns the gear 78 and shaft 76 so that the actuator 69 is turned to effect a wedge engagement of the rollers 71 with the brake casing 68 for this unit and hence said carrier is held stationary and the drive occurs through this gear set, as previously described.

Similarly, when the planetary gear carrier 51 of the second change-speed unit tends to rotate backwards the gear 87 turns the gear 83 and shaft 81 so that its brake actuator 69 is turned to effect a wedge engagement of the rollers 71 with the brake casing 68 for this unit and hence this carrier is held stationary and the drive occurs through this gear set, as previously described.

It is also a well-known fact that in the operation of planetary gearing mechanism that when the driven member is rotated or is rotating faster than the drive member the planet gears will turn in the same direction as the driven member and carry the planetary gear carrier with them and when in the present instance they do so turn the actuators 69 of the one-way brakes are then revolved in the direction to release the rollers 71 from their brake drums 68 so that planet carriers are free to keep turning and in the present instance, while either of the planet carriers is in this condition, automatic, centrifugally-operated clutch mechanism comes into action to lock the planet gear carrier to its driven member to revolve therewith and hence hold its planet gears against further rotation and cause them to act as keys between the drive and driven gears of the planetary gear unit and thus cut this unit out of gear.

In connection with the first change-speed unit, a clutch drum 88 is keyed by key 45 to the sleeve shaft 46 or driven shaft of said unit while with the second speed unit a clutch drum 88' is journalled on the sleeve shaft 56 but adapted to be clutched thereto by intermeshing of a gear 89 on said drum with a change-speed clutch gear 90, which is slidably keyed by key 59' to the shaft 56. (See Fig. 1.)

The automatic clutch mechanisms which I prefer to use to connect the drums 88 and 88' are similar and have been fully shown and described in my copending application, Serial No. 437,452, filed March 20, 1930, and hence will be only briefly described here. Each clutch, as shown in Figs. 8 and 9, includes a plurality of centrifugally-operated, sector-shaped clutch shoes 91 slidably guided on guides 91' on the disk or spider of the respective planetary carrier by which they are driven and radially movable outwardly against the opposing resistance of a spring 92 mounted in a bore 93 of the shoe upon a rod 94 on which the shoe is free to slide and between the bottom of the bore and a tension-adjusting nut 95 on said rod, said shoes having a suitable friction lining 96 for frictionally engaging the clutch drum 88 or 88'. To provide for a positive drive, after the frictional drive engagement has been established each of the shoes 91 has mounted within it weighted clutch pins 97 movable into openings 98 in the clutch drum 88 or 88' under the action of centrifugal force, the movement of these pins being preferably resisted until after the shoes 91 have established a relatively firm, clutched engagement with the drum in each instance by a spring 99 interposed between a tension adjusting and guide sleeve 100, in threaded engagement with the bore 101 in which the pin and its spring are mounted, and a seating ring 102 secured to the stem 103 of the pin by a split ring 104 interlocked in a groove 105 on said stem, the weighted head 106 of said pin being slidably mounted in the sleeve 100 and the stem 103 similarly mounted in a bore 107 in the shoe.

It will now be observed that so long as the planetary gear carrier of each change-speed unit stands still the weights or shoes 91 do not move. When, however, the operator of the vehicle decides that he is going fast enough in gear and wishes to change to a higher gear he decelerates the engine, causing the vehicle to try to drive the engine through the planetary gearing, thus causing the first planetary gear carrier to release its automatic brake, as previously described, and thus rotate with its driven gear 44, thereby causing the shoes 91 on said carrier to move out into clutched engagement with the clutch drum 88 and thereafter, as the speed increases, causing movement of the pins 97 into positive locking engagement with said drum 88 so that this unit then revolves as a unit with the drive shaft and the vehicle is then in second gear, as the drive is then from shaft 20, gears 35, 36, 43 and 44 to shaft 46 and gear 47, acting as one unit and revolving as a shaft, and thence through gears 48 and 49 to gear 55, shaft 56, gears 58 and 67 and shaft 64. If, then, as he proceeds in second gear, he again decelerates the engine, causing the vehicle to try to drive through the second planetary carrier, this causes said carrier to release its automatic brake, as previously described, and thus rotate with the driven gear 55, thereby causing the shoes 91 on said carrier to move out into clutched engagement with the clutch drum 88' and, thereafter, as the speed increases, movement of the pins 97 into positive locking engagement with said drum so that this second unit revolves as a unit with the drive shaft and the vehicle is then in direct drive or high gear.

When the vehicle is in high or direct drive, if its speed is diminished or it slows down to such an extent as to permit the springs 99 and 92 to release the clutch elements 97 and 91, respectively, of the second gear unit, the one-way brake of this unit will again hold the planetary carrier stationary and the vehicle will then proceed in second gear and a further reduction in speed will permit the springs 99 and 92 to release the clutch elements 97 and 91, respectively, of the first gear unit so that its one-way brake will again hold the planetary carrier of this unit stationary and the vehicle will proceed in low gear.

It is sometimes highly desirable in driving to change immediately from high to second and in order that the operator, with the present automatic shift, may not have to wait for a reduction in speed of the vehicle to change from high to second, means have been provided, under the control of the operator, for immediately placing the vehicle in second speed. In this connection, it has been pointed out that the drum 88' is loose on the shaft 56 and only connected thereto through the clutch gears 89 and 90 and hence a shifting of gear 90 out of mesh with its companion gear 89 will release the drum 88' and hence allow the vehicle to proceed immediately in second gear, regardless of the engagement at that instant of the automatic clutch for this unit.

Referring to Figs. 4, 6 and 7, a stud shaft 108 has the usual brake pedal 109 mounted thereon and a pedal 110 provided with an arm 111 operatively connected by a link 112 with a crank arm 113 pinned to a shaft 114 journalled in a boss 115 in the casing 21 and having an arm 116 working inside said casing against a lug 117 on a shifter fork 118 slidably mounted on a shaft 119. This fork 118 has its bifurcations working in an annular groove 120 in the hub of the gear 90 so that as the pedal 110 is moved by the operator to turn the shaft 114 in a clockwise direction, the arm 116 engages the lug 117 and moves the fork 118 toward the right, as viewed in Figs. 1, 4 and 7, and hence moves the gear 90 out of mesh with the gear 89, this movement of the fork 118 being opposed by a spring 121 on the rod 119 and being limited for this operation to only a disengaging movement by a stop 122 on the arm 113 coming into engagement with a stop 123 on the boss 115.

Thus, with the gears 89 and 90 out of mesh the gears of the second planet carrier become active again and tend to move in the opposite direction to reverse the planet carrier and be restrained by its one-way brake so that the vehicle proceeds in second gear, but when the operator releases the pedal 110 the spring 121 acting on the shifter fork 118 is then free to move the same to bring the gear 90 back into mesh with the gear 89 and the drum 88' is then ready, through the driven gear 55 to be put in high again the minute the operator decelerates and causes the governor weights 91 of this unit to revolve and again effect a clutched engagement so that the second speed gear unit again revolves as a unit with the drive and driven shafts.

For effecting the reverse drive through one of the planetary gear units, means have been provided for holding the shaft 56 against rotation while allowing drum 88' to rotate freely and for releasing the one-way brake of the second planetary carrier 51.

Referring to Figs. 1, 6, 7 and 10, it will be seen that the clutch gear 90 has another clutch gear 124 formed integral with it, which is adapted to mesh with an internal gear 125 secured by bolts 126 to the end plate 23 when the shifter fork 118 is moved, independently of the shaft 114, by the lengthwise movement of the shaft 119, since said shaft has a shoulder 127 against which the hub of the shifter fork 118 is held by the spring 121.

The shaft 119 is suitably slidably mounted in the casing and has the shifter fork 128 fixed thereto and engaging in an annular groove 129 in the hub of the gear 67, see Figs. 1, 2 and 6. Thus, when shaft 119 is shifted by means under the control of the operator, gear 124 will be moved into mesh with gear 125, thereby holding shaft 56 against rotation and clutch gear 67 will be moved into mesh with clutch gear 60, thus connecting shaft 59 direct with driven shaft 64 and, also, during this movement clutch gear 90 is moved out of mesh with clutch gear 89 and clutch gear 67 is moved out of mesh with clutch gear 58.

The shaft 59 has a spider 130 splined thereto at 131 and keyed to the planet carrier 51 of the second change-speed unit by blocks 132 and the bolts 54, (See Fig. 2) consequently, when the planet carrier 51 is free to turn about the then stationary shaft 56 it will turn the shaft 59 and through clutch gears 60 and 67 turn shaft 64 in reverse rotation to that of the gear 47 and the drive shaft 20.

To permit of the release of the one-way brake mechanism for the second speed gear unit, so that said carrier 51 can turn as above described, means, under the control of the operator, are provided for shifting clutch gear 86 out of mesh with clutch gear 85, see Figs. 6 to 10, at the same time shaft 119 is shifted to bring gear 124 into mesh with gear 125 and this control will now be described.

Referring to Figs. 2, 5, 6, 7, 10, an operator-controlled lever 133 has a split hub clamped by a bolt 134 to a hollow shaft 135 journalled in bearing boss 136 in the casing 21 and also free to rotate and supported at its lower end on another rotatable control shaft 138 within it, which projects below the shaft 135 and is journalled at its lower end in a bearing 137 in said casing. A crank arm 139 is secured by serrations 140 and clamping bolt 141 to the shaft 135 and has a forked end 142 receiving the pin end 143 of a collar 144 keyed at 145 on the shaft 119, whereby movement of the lever 133 will turn shaft 135 and arm 139 to shift the shaft 119. A crank arm 146 is also fixed on the shaft 135 and has a pin 147 having a lost motion connection with spaced lugs 148 and 149 on the hub 150 of a shifter fork 151 slidably mounted on a supporting shaft 152 and engaging in an annular groove 153 of the hub of the gear 86, whereby the same movement that turns shaft 135 to shift shaft 119 on reverse will also, through the arm 146 and engagement of pin 147 with lug 149, move shifter fork 151 to disengage gear 86 from gear 85. The lugs 148 and 149 are spaced apart to provide the lost motion connection above referred to so that shaft 135 may be turned to shift shaft 119 to a position in which the transmission is in neutral, that is, in which clutch gears 90 and 124 are out of mesh with their companion clutch gears 89 and 125 and clutch gear 67 is out of mesh with its companion clutch gears 58 and 60.

When, as above described, the shaft 119 is shifted all the way so as to bring clutch gear 124 into mesh with the fixed gear 125 and clutch gear 67 into mesh with the clutch gear 60, and so as to move clutch gear 86 out of mesh with clutch gear 85 to disengage the planetary gear lock for the second speed unit, the planetary gear carrier 51 is then permitted to be revolved in the opposite direction from that of its drive shaft 46, because of the known fact that when the driver gear 47 turns the planet gears 48 and 49, said gears move around the stationary gear 55 in the opposite direction and since the spider 130 is keyed to the shaft 59, which in turn is connected through the clutch gears 67 and 60 to the driven shaft 64, the vehicle is driven backward.

Since the planet carrier 51 is revolving in the opposite direction in reverse, the clutch mechanism, including the governor weights or clutch elements 91 and 97 will be operative to expand and lock with the drum 88', but since the gears 89 and 90 are disengaged this drum will run free. As to the first unit, in reverse the same will be running either in or out of gear, depending upon the speed of the vehicle and this provides two speeds in reverse.

When the shaft 135 is turned by the operator back to its forward position, the clutch gears 90 and 89 will be again meshed, the clutch gears 67 and 58 again meshed and the arm 146 will cause the pin 147 to engage lug 148 to shift the shifter fork 151 so as to again bring gear 86 into mesh with gear 85.

When, under certain conditions, such as going down hill, it is desired to lock the drive of the vehicle in either first or second gear, means are provided, under the control of the operator, for accomplishing this by turning of the shaft 138 from an operator-controlled crank arm 153, as now to be described.

The shaft 138 extends down through the shaft 135 and projects from the lower end thereof and is journalled at its lower end in a bearing 137 and has a crank arm 154 secured thereto operatively connected by a link 155 to a double shifter member 156 slidably mounted on the shaft 152. Shifter member 156 has a forked end 157 engaging in an annular groove 158 in the hub of a lock gear 159 splined at 160 on the shaft 81 and slidably movable into engagement with a fixed internal lock gear 161 formed as a part of the casing 68 for the one-way brake mechanism of the second planetary carrier. Shifter member 156 has another fork 162 engaging in an annular groove 163 in the hub of a lock gear 164 splined at 165 on the shaft 76 of the first speed planetary carrier brake mechanism and slidably movable into engagement with a fixed internal gear 166 formed as a part of the casing 68 for this brake mechanism. This shifter member 156 is normally held in a release position by a spring-pressed ball detent 167 mounted in its hub and engageable in an annular recess 168 in the shaft 152.

It will be observed from Fig. 6 that the distance gear 164 has to travel before coming into engagement with its companion gear 166 is greater than the distance the gear 159 has to travel before engaging with its companion gear 161, with the result that the first movement of the shaft 138, link 155 and shifter member 156 causes the shifter 157 to move lock gear 159 into meshed engagement with the lock gear 161 to thereby lock the second planetary carrier 51 and thus lock this change speed unit in gear, and that a further movement of the shaft 138, link 155 and shifter member 156 causes the gear 159 to travel further into the gear 161 and at the same time causes fork 162 to move lock gear 164 into meshed engagement with the lock gear 166 to thereby lock the first planetary carrier 39 and thus lock this unit in gear so that the vehicle is then held in low gear. It will, therefore, be noted that dependent upon the arc of movement of the shaft 138, by the operator, the parts above described will be moved to either lock the transmission in second or in low gear.

If it is necessary to slow down the planetary gearing to effect the locking in second or low gear, I have provided a brake drum 169 on an exterior extension of the shaft 81 into engagement with which a brake band 170 is movable under the control of the operator by his application of the brake pedal 109, said pedal being connected by a link 171 to crank 172 on a shaft 173 journalled in the lower part of the housing 28 and carrying an arm 174 connected by pivotally connected links 175 and 176 to a rod 177 passing through the ends of the band and held at one end against one of them by a release spring 178 and nuts 179. The other end of said rod is pivotally connected to the link 176 by a pin 180 and the forked ends 176' of this link at said pin are cam-shaped so that when the operator presses down on the brake pedal he will, through link 171, crank 172 and shaft 173, swing the arm 174 downwardly and thus pull the links 175 and 176 downwardly, causing the cam ends 176' to exert an inward pressure against the end of the brake band with which they engage and thus, through the rod 177, draw the ends of the brake band together and against the drum to apply the brake, which is released on the release of pressure from the brake pedal by the spring 178. Thus, when the operator starts to apply or applies the main brakes he will at the same time apply the brake band 170 to the drum 169 to slow down the second speed planetary gearing. It is, of course, obvious that the brake band 170 may also be controlled by a separate lever, such as the lever 109', shown in Fig. 13, that may be connected to the link 171.

In order to prevent the vehicle from rolling backward down hill when it is stalled or is standing still, a one-way automatic brake mechanism is provided between the drive shaft 20 and the front end plate 22 of the transmission housing, which mechanism is shown in Fig. 14 and includes a fixed brake casing 180 secured by bolts 181 to the plate 22, brake rollers 182 associated with an actuator 183 which is splined to the shaft 20, the rollers 182 being held against endwise movement by a ring 185 and a retainer and releasing member 186, the actuator being held against endwise movement by a lock washer 187' and a sleeve-nut 187 in threaded engagement with the shaft 20 and surrounded by an oil retainer ring 188. The rollers 182 work between the actuator 183 and cam or wedge-shaped recesses 180' in the casing 180, whereby a tendency of the shaft 20 and the actuator 183 to turn backwards causes said rollers to be wedged between said actuator and said casing 180. The retainer and releasing member 186 has a cylindrical portion 183' which is slotted at spaced intervals to provide spaces in which the rollers 182 work and to provide arc-shaped portions 184 therebetween. This cylindrical portion 183' is mounted to turn about the shaft 20 under the control of the operator and for this purpose is provided with a laterally extending arm 184' connected at its free end by a pin and slot connection 185' with an actuating rod 186' which at its upper end projects through an opening in the clutch housing and is provided with a foot button 188' and is normally held in an inoperative position by a spring 189'. It has been noted that when the shaft 20 starts to move backwards the rollers will be engaged with the parts 180 and 183, the member 186 being then in the position shown in Fig. 14. When, under certain conditions of operation, it is found difficult to shift the transmission gearing into reverse, as when the vehicle is standing on a hill or one of the wheels has its tire closely pressing against the curbing, this condition is relieved by the operator's pressing down on the foot button 188', which, through the downward movement of the rod 186' swings the arm 184' downwardly, thereby turning the parts 183 into engagement with the rollers 182 and moving said rollers from the high to low parts of the cam recesses 180' so that the shaft 20 is free to turn and this eases the rest of the gearing so that the operator may readily shift into reverse. It is to be noted from Fig. 14 that the clearance spaces between the rollers 182 and parts 184' is progressively larger so that the rollers 182 are progressively released by the turning of said parts, as above described, so that there is but little effort on the part of the operator to do this. It is also to be noted that while this brake mechanism is relatively light in construction, it must be remembered that under the conditions during which it is operative the planetary gear units are also in gear and that since under these conditions the vehicle is in low gear only a small braking force is necessary to hold the vehicle on an incline. This brake mechanism, of course, has no effect on the normal running of the vehicle, since under those conditions the rollers 182 are free to revolve in the spaces between the parts with which they cooperate.

It has previously been pointed out that any suitable clutch mechanism may be used to connect the engine shaft 189 with the shaft 20 and this may be a manually-controlled clutch, but in order to relieve the operator of the necessity for operating the clutch, I have provided an automatic clutch of the type shown in application Serial No. 437,452, previously referred to, and also like the automatic change-speed clutches herein shown in Figs. 8 and 9, and previously described.

As shown in Fig. 1 the fly-wheel 190 is secured by bolts 191 to the flanged end 192 of the engine crank shaft, which bolts also secure the hub 193 of a clutch support and guide ring 194 thereto. The fly-wheel 190 has a laterally flanged rim 195 providing a recess 196 in which the clutch elements and the clutch drum 197, having a hub 198 splined to the shaft 20, are free to work. It will be noted that the end 199 of the shaft 20 projects into and is journalled and supported in the hollow, bushed end 200 of the engine crank shaft.

The ring 194 has radially disposed ribs 201 on which the centrifugally-operated, sector-shaped clutch shoes 202, similar to the shoes 91, are slidably mounted and keyed and each movable radially outward against the opposing resistance of a spring 203 mounted in a bore 204 of the shoe upon a rod 205 anchored to the ring 194 and on which the shoe is free to slide and between the bottom of said bore and a tension-adjusting nut 206 on said rod, said shoes having a suitable frictional lining 207 for frictionally engaging the clutch drum 197. To provide for a positive drive after the frictional drive engagement has been established, each of the shoes 202 has mounted within it weighted clutch pins 208, movable into openings 209 in the drum 197, under the action of centrifugal force, the movement of these pins being preferably resisted until after the shoes 202 have established a relatively firm, clutched engagement in each instance by a spring 210 interposed between a tension-adjusting and guide sleeve 211 and a seating ring 212 provided on the stem, said sleeve and stop being similar to the sleeve 100 and ring 102 and similarly mounted and secured.

With this construction, when the engine is not running the clutch is disconnected and the clutch elements are inoperative. After the engine is started and the speed of the shaft 189 becomes such as to overcome the resistance of the springs 203, the weights or shoes 202 move into frictional engagement with the drum 197 and the shaft 20 starts to revolve, and, thereafter, on a further increase in speed the pins 208 move outwardly against the action of their opposing springs 210 into positive, clutched engagement with the sides of the openings 209 of said drum and the shaft 20 is then directly connected to the engine shaft. Conversely, on a reduction in speed of the engine, the clutch elements are released by their respective springs in the reverse order and the engine is then disconnected from the transmission mechanism.

In order that the lever 133, controlling the placing of the transmission in forward, neutral or reverse, may be under the convenient control of the operator, the ball-shaped outer end 213 of said lever is operatively connected to a socket joint 214 provided in one end of a link 215, which has a ball and socket joint connection 216 at its other end with one end of a lever 217, pivoted intermediate its ends on a suitably supported pivot 218 and pivotally connected at its upper end to a push-and-pull rod 219 slidably mounted in the dash 220 of the automotive vehicle and having an operating handle 221 thereon, see Fig. 12.

In order that the lever 153 controlling the locking of the transmission in either first or second speed may be under the control of the operator, its free end 222 is operatively connected by a link 223 with a lever 224 also mounted on the pivot 218 and connected at its other end by a link 225 to one end of a lever 226, pivoted intermediate its ends on a suitably supported pivot 227 and connected at its other end by a link 228 to a push-and-pull rod 229 slidably mounted in the dash 220 and provided with a button handle 230, see Fig. 12.

Fig. 13 shows the controls arranged in an automotive vehicle adjacent the driver's seat and it will be observed that the handles 221 and 230 extend outwardly from the dash 220 on the left side of the steering column 231; that the second speed control pedal 110 is at the left side for control by the left foot of the operator; that the brake pedal 109 is controlled by the operator's right foot, as is also the starter switch button 232, the accelerator or throttle pedal 233 and the no roll back release button 188'.

While the foregoing description has necessitated going into considerable detail, the actual operation of the transmission or its control by the operator is very simple.

With the vehicle at rest and the lever 133 in neutral, the operator starts the engine by depressing the starter button 232 and manipulating the ignition controls. When the engine is started and has been sufficiently warmed up the engine is throttled down to idling speed, which frees its shaft from the shaft 20 and then the operator pushes the handle 221 inwardly so that through rod 219, lever 217, link 215, the lever 133 is swung toward the right, as viewed in Fig. 12, so that through the connections previously described rod 119 is moved toward the left, thereby moving shifter fork 128 to the left and causing spring 121 to move shifter fork 118 to the left with rod 119. It is to be noted from Figs. 2 and 7 that the shifter rod 119 has three spaced, annular grooves 234 into any one of which a detent 235, in the form of a ball, is urged by a spring 236, the detent and spring being suitably mounted in a boss 237 in the transmission casing, whereby the rod 119 is releasably held in any one of its selective positions and held there firmly enough in its high speed position so that when shifter 118 is caused to move against the pressure of the spring 121, the pressure exerted by said spring 121 will not release said rod. This action brings clutch gears 89 and 90 into mesh and clutch gears 58 and 57 into mesh and the transmission is then in gear. Then when the engine is accelerated and obtains sufficient torque to actuate the clutch elements 202 and 208, the engine shaft 189 is then directly connected to the transmission drive shaft 20 and the vehicle proceeds in low gear, the automatic brakes for the planetary carriers 39 and 51 holding said carriers against turning backward. If now the operator desires to go into second speed, a reduction in speed of the drive shaft 20 through the deceleration of the engine by the brief closing or partial closing of the throttle, through the operator's release or partial release of the pedal 233, causes the release of the automatic brake of the first planetary gear unit and the automatic operation of its clutch to connect the gearing of this unit for turning with the drive shaft and the vehicle then proceeds in second. It is also to be noted that the springs 92 and 99 for the automatic clutch of the second speed gear unit are of greater tension than the corresponding springs of the automatic clutch of the first speed gear unit and also these springs of the first unit are of greater tension than the corresponding springs 203 and 210 of the main or engine clutch mechanism. The result is that these clutches will be successively engaged and disengaged step by step as the vehicle's speed is increased or decreased. While in second, if the operator again decelerates the engine speed by closing or partially closing the throttle by release or partial release of the pedal 233, the automatic brake mechanism of the second speed planetary unit is released and its centrifugally-operated clutch mechanism operates to connect the gearing of this unit for turning with the drive shaft and the vehicle is in high or the shafts 20 and 64 are then driven direct at engine speed. If, while proceeding in high gear, the operator wishes to proceed in second without waiting for the speed of the vehicle to diminish so that the clutch mechanism of the second planetary unit will release, he simply presses down on the pedal 110, which, we have seen, acts through the connections previously described to move shifter fork 118 only to declutch the clutch gear 90 from the clutch gear 89, and thereafter a release of said pedal will cause spring 121 to restore the normal automatic operation of the transmission.

If the operator wishes to move the vehicle backward, he pulls the handle 221 outwardly through neutral into reverse and thereby shifts the lever 133 toward the left, which, as we have seen, acts to move the shifter forks 118 and 128 to release clutch gears 89 and 90 and clutch gears 58 and 67 and bring clutch gear 124 into mesh with the fixed clutch gear 125 and clutch gear 67 then meshes with clutch gear 60 and clutch gear 86 is moved out of clutched engagement with clutch gear 84 which, we have seen, puts the transmission in condition for reverse through the use of the planet gears 48 and 49 of the second change speed unit as reverse gears.

Should the driver wish to maintain the transmission indefinitely in second, he pulls the button 230 and rod 229 out about half way which, through the link 233, lever 244, link 225, lever 226 and link 228, swings the arm 153 through half its travel toward the right, as viewed in Fig. 6, and this, through the mechanism previously described, moves shifter member 156 so as to move clutch gear 159 into engagement with lock gear 161, thereby positively preventing the rotation of the shaft 81 and hence, through the gearing 83, 87, holding the second speed planetary gear carrier against rotation. Then should the driver wish to keep the transmission in low gear he pulls the button 230 all the way out which, through the connections previously described, causes the shifter member 156 to act through the connections previously described to lock both shafts 81 and 76 and their associated planetary gear carriers against turning so that the vehicle will proceed in low gear. If, as above described, it is found necessary to slow down the transmission before locking it in second, the operator applies the brake band 170 to the drum 169 on shaft 81 through the operation of either the brake pedal 109, as above described, or a separate lever 109', it being noted that this band brake is only subject to intermittent operation and that its clearance may be relatively large and that it is not in operation during the regular automatic operation of the transmission. It is to be understood that when locking the transmission in second or low gear the vehicle should first be slowed down to second and low gear speeds, respectively, before operating the locking means.

The automatic clutch connecting the engine shaft with the drive shaft 20 of the transmission is, of course, designed so that it will keep the engine in clutched engagement with the transmission when the engine is operating at any speed necessary to keep the transmission in gear and its automatic operation makes the whole drive from the engine to the propeller shaft of the vehicle automatic so that the operator is relieved of the usual duty of shifting the engine clutch. The automatic clutch, however, is designed to be in disengaged position at the idling speed of the engine. Furthermore, with this automatic clutch mechanism, it is impossible to kill the engine should the vehicle slow down below the driving or stalling speed. It is also to be noted that the various sets of clutch gears heretofore noted form jaw clutches and that the term "clutch gear", as used herein and in the claims, is synonymous with "jaw clutch member" and is to be so construed.

It is also to be noted from Figs. 1, 2 and 5 that the automatic brakes and their shafts, which are intergeared with the planetary gear carriers, are disposed at the lower portion of the casing so that these shafts and their control mechanism operate in the lubricant supplied to the transmission. Also, instead of having the control for operating the brake band 170 from the foot brake pedal 109 the operating link 171 may be connected to the foot pedal 110 so that when the operator moves the pedal 110 to move shifter 118 to release the clutch drum 88' from the second speed unit brake 170 will be applied at the same time and then the positive locking button 230 may be operated so as to lock the vehicle in second.

I desire it to be understood that this invention is not to be limited to any particular form or arrangement of parts except insofar as such limitations are included in the claims.

What I claim as my invention is:

1. In an automatic change speed transmission mechanism, the combination of a drive shaft, a driven shaft, change speed planetary gear units between said shafts, means for operatively connecting said units together, each unit including a planetary gear carrier, automatically operating means for holding said carriers in and out of clutched engagement with their driven gears, and means for declutching the planetary gear carrier of one of said units from its driven gear regardless of the operation of said automatically operating means.

2. In an automatic change speed transmission mechanism, the combination of a drive shaft, a driven shaft, a change speed planetary gear unit between said shafts including a planetary gear carrier, automatically operating means for holding said carrier against reverse rotation, a clutch drum, automatically operable means for connecting said planetary gear carrier to said clutch drum, a clutch gear on said drum, a clutch gear mounted on said driven shaft, said clutch gears being shiftable relative to each other to connect or disconnect said drum and driven shaft regardless of the connection of said carrier with said drum.

3. In an automatic change speed transmission mechanism, the combination of a drive shaft, a driven shaft, a change speed planetary gear unit between said shafts including a planetary gear carrier, an automatically operable brake mechanism operable to restrain movement of said carrier on its tendency to rotate backward, a clutch mechanism for connecting said carrier to its driven shaft and including a drum mounted on the driven shaft and radially movable, centrifugally operable clutch elements mounted on said gear carrier and movable into engagement with said drum, said brake mechanism being releasable from said gear carrier when said carrier is driven by said driven shaft on a temporary reduction in speed of the drive shaft below that of the driven shaft, said carrier, when so released, being operable through said clutch elements to actuate said clutch mechanism for connecting said carrier to its driven shaft to change the gear ratio.

4. In an automatic change speed transmission mechanism, the combination of a drive shaft, a driven shaft, a change speed planetary gear unit between said shafts including a planetary gear carrier, an automatically operable brake mechanism operable to restrain movement of said carrier on its tendency to rotate backward, a separate, positively locking, automatic clutch mechanism for connecting said carrier to its driven shaft and including clutch elements mounted on said gear carrier, and a drum on said driven shaft with which said elements positively lock, said brake mechanism being releasable from said gear carrier when said carrier is driven by said driven shaft on a temporary reduction in speed of the drive shaft below that of the driven shaft, said carrier, when so released, being operable through said clutch elements to actuate said clutch mechanism for connecting said carrier to its driven shaft to change the gear ratio.

5. In an automatic change speed transmission mechanism, the combination of a drive shaft, a driven shaft, a change speed planetary gear unit between said shafts including a planetary gear carrier, an automatically operable brake mechanism operable to restrain movement of said carrier on its tendency to rotate backward, a separate automatic clutch mechanism for connecting said carrier to its driven shaft and including clutch elements mounted on said gear carrier, and a drum with which said clutch elements cooperate, a manually controlled jaw clutch for connecting and disconnecting said drum with said driven shaft, said brake mechanism being releasable from said gear carrier when said carrier is driven by said driven shaft, said carrier, when released, being operable through said clutch elements to actuate said clutch mechanism for connecting said carrier to its driven shaft to automatically change the gear ratio.

6. In an automatic transmission, the combination of a drive shaft, a driven shaft, a change speed planetary gear unit between said shafts including a planetary gear carrier, an automatic one-way brake mechanism intergeared with said carrier to automatically hold said unit in gear, automatically operating clutch mechanism for connecting said carrier to said driven shaft to change the gear ratio on a reduction in speed of the drive shaft below that of the driven shaft, and manually controlled locking means associated with said intergeared brake mechanism to prevent its operation and hold said carrier against movement to maintain said unit in gear.

7. In an automatic transmission, the combination of a drive shaft, a driven shaft, a change speed planetary gear unit between said shafts including a planetary gear carrier, an automatic brake including a brake shaft and a brake actuator mounted on said brake shaft, a gearing connection between said brake shaft and said planetary gear carrier, automatically operating clutch mechanism for connecting said carrier to said driven shaft to change the gear ratio on a reduction in speed of the drive shaft below that of the driven shaft, and manually controlled locking means associated with said brake shaft to prevent operation of said brake and hold said carrier against movement to maintain said unit in gear.

8. In a transmission, the combination of a drive shaft, a driven shaft, change speed planetary gearing units between said shafts, each unit including a planetary gear carrier, an automatic one-way brake mechanism intergeared with each carrier, automatically operating clutch mechanism for connecting each carrier to the driven gear of its unit, means for operatively connecting said units together, locking means associated with each of said intergeared brake mechanisms, and manually controlled means for successively operating said locking means on a unidirectional movement of said manually controlled means.

9. In an automatic transmission, the combination of a drive shaft, a driven shaft, a change speed planetary gear unit between said shafts including a planetary gear carrier and its gears, a drive gear and a driven gear and its shaft, a shaft revolving with said planetary gear carrier, brake means associated with said carrier to prevent its tendency to rotate backward, governor controlled means for connecting said gear carrier to revolve with said drive and driven gear shafts, a jaw clutch connecting said last-named means to said driven gear shaft and a jaw clutch connecting said driven gear shaft with said driven shaft for forward drive, a jaw clutch connecting the shaft revolving with said carrier with said driven shaft and a locking clutch for holding said driven gear and its shaft against rotation for reverse drive, a clutch for releasing said brake means, and manually controlled means for disconnecting said two first named clutches and connecting said three last named clutches whereby said carrier is reversely driven by said drive shaft and through its shaft and clutch connection with said driven shaft drives said driven shaft in reverse at a reduced speed to that of said drive shaft.

10. In an automatic transmission, the combination of a drive shaft, a driven shaft, a change speed planetary gear unit between said shafts including a planetary gear carrier, planet gears on said planetary carrier and drive and driven gears always in mesh with said planet gears, means for automatically connecting said carrier to revolve with its drive, driven gears for forward drive, and means for rendering said last named means ineffective and connecting said planetary gear carrier direct to said driven shaft for reverse drive and means for locking the driven gear of said unit to obtain a reverse drive.

11. In an automatic transmission, the combination of a drive shaft, a driven shaft, a change speed planetary gear unit between said shafts including a planetary gear carrier, governor controlled means for connecting said carrier to revolve with said shafts, an automatic brake including a brake shaft and a brake actuator mounted on said brake shaft, a gearing connection between said brake shaft and said planetary gear carrier including a gear loose on said brake shaft, and a manually controlled positive clutch for connecting said gear to said shaft.

12. In an automatic transmission, the combination of a drive shaft, a driven shaft, a change speed planetary gear unit between said shafts including a planetary gear carrier, governor controlled means for connecting said carrier to revolve with said shafts, an automatic brake including a brake shaft and a brake actuator mounted on said brake shaft, a gearing connection between said brake shaft and said planetary gear carrier including a gear loose on said brake shaft, a manually controlled positive clutch for connecting said gear to said brake shaft, and a manually controlled means for locking said brake shaft against rotation.

13. In a transmission, the combination of a drive shaft provided with a drive gear, a sleeve shaft provided with a driven gear, a planetary gear carrier provided with planet gears meshing with said drive and driven gears and mounted to revolve with and relative to said gears, a shaft mounted within said sleeve shaft and connected to revolve with said planetary carrier, a driven shaft, shiftable clutch means for connecting said driven shaft to said sleeve shaft for forward drive and for connecting the shaft within said sleeve shaft to said driven shaft for reverse drive, and shiftable clutch means for operatively connecting said planetary carrier to said sleeve shaft for forward drive and for locking said sleeve shaft against rotation for reverse drive, and manually controlled means for simultaneously operating said clutch means.

14. In an automatic change speed transmission, the combination of a drive shaft, a driven shaft, low and second speed planetary gear units for progressively, automatically changing the gear ratio between said shafts from low to direct drive, each unit including an automatic, speed-responsive clutch mechanism, the clutch mechanism of the second speed unit connecting said unit to the driven shaft for direct drive and manually controlled jaw clutch means between the clutch mechanism of the second speed gear unit and the driven shaft.

15. In an automatic change speed transmission, the combination of a drive shaft, a driven shaft, low and second speed planetary gear units for progressively, automatically changing the gear ratio between said shafts from low to direct drive, each unit including an automatic, speed-responsive clutch mechanism, the clutch mechanism of the second speed unit connecting said unit to the driven shaft for direct drive, a jaw clutch including a movable clutch member between the clutch mechanism of the second speed gear unit and said driven shaft, a shifting member for said movable clutch member, a shifting shaft on which said shifting member is mounted to move with and relative thereto, manually controlled means for moving said shifting shaft to move said shifting member, and separately controlled means for moving said shifting member independent of said shifting shaft.

16. In an automatic change speed transmission, the combination of a drive shaft, a driven shaft, a change speed planetary gear unit between said shafts, said unit including drive and driven gears and a planetary gear carrier, an automatic brake to hold said carrier against rotation, an automatic clutch to connect said carrier to revolve with its driven gear, means for rendering said automatic brake inoperative, means for rendering said automatic clutch inoperative and for holding the driven gear of said unit against rotation, means for connecting said planetary gear carrier direct with the driven shaft, and a single control for all of said means.

17. In an automotive vehicle, the combination with the engine shaft, of a transmission drive shaft, centrifugally operable clutch mechanism for connecting said shafts together, a driven shaft, governor controlled change speed planetary gear units between said drive and driven shafts with one of said units controlling the other unit, each of said units including a planetary gear carrier, drive and driven gears and being operable to change the gear ratio between said drive and driven shafts upon respective reductions in speed of the drive shaft below the speed of the driven shaft, means for rendering the second governor controlled unit inoperative at the will of the operator, and manually controlled means to selectively, positively hold said planetary gear carriers against rotation to maintain said transmission in the desired gear ratio.

18. In an automatic transmission, the combination of a drive shaft, a driven shaft, automatically variable change speed mechanism for progressively changing the drive of the driven shaft from "low" to "high", and means including a disconnectible clutch under the control of the operator to immediately put said change speed mechanism in a lower gear ratio without reducing the speed of the driven shaft when in "high".

19. In an automatic transmission, the combination of a drive shaft, a driven shaft, automatically variable change speed mechanism for progressively changing the gear ratios between the drive and driven shafts from "low" to "second" to "high", and means including a disconnectible clutch under the control of the operator to immediately render said change speed mechanism ineffective to maintain said mechanism in "high" and put said mechanism in "second" without reducing the speed of the driven shaft when in "high".

20. In an automatic transmission, the combination of a drive shaft, a driven shaft, automatically variable change speed transmission mechanism for progressively changing the gear ratios between said drive and driven shafts from "low" to "direct" drive, and a jaw clutch between said mechanism and said driven shaft which when disconnected immediately places the transmission in "second" while proceeding in "direct" drive at high speed.

21. In a change speed transmission for automotive vehicles, the combination of a transmission drive shaft, a driven shaft, automatically variable change speed transmission mechanism for progressively changing the gear ratio between said drive and driven shafts, a one way brake for said drive shaft operable through said transmission mechanism, when the latter is turned by the reverse movement of the driven shaft, to prevent the vehicle rolling backwards and including a plurality of braking elements, and manually operable means for progressively releasing said braking elements.

22. In an automatic transmission, the combination of a drive shaft, a driven shaft, automatically variable change speed transmission mechanism between said shafts including a plurality of change speed governor-controlled planetary gear units with one unit driving into and controlled by the other unit to advance and decrease the gear ratio step by step, each of said units including a planetary gear carrier, automatic brake mechanism for each planetary carrier including a brake shaft, and operator-controlled means for separately controlling said shafts to control said gear units.

23. In an automatic transmission, the combination of a drive shaft, a driven shaft, change speed planetary gear mechanism between said shafts including a planetary gear carrier, one-way automatic brake mechanism for preventing rotation of said carrier on its tendency to turn backwards, said brake mechanism being intergeared with said carrier, manually-controlled, positively locking means acting through said brake mechanism to lock said carrier in gear, and friction brake means acting through said brake mechanism to stop said carrier before operating said locking means.

In testimony whereof I affix my signature.

OSCAR H. BANKER.

CERTIFICATE OF CORRECTION.

Patent No. 1,843,193.             Granted February 2, 1932, to

OSCAR H. BANKER.

It is hereby certified that error appears in the printed specification of the above numbered patent requiring correction as follows: Page 3, line 11, before the word "gears" insert the word clutch; and that the said Letters Patent should be read with this correction therein that the same may conform to the record of the case in the Patent Office.

Signed and sealed this 5th day of April, A. D. 1932.

(Seal)

M. J. Moore,
Acting Commissioner of Patents.